(12) United States Patent  
Qiao et al.

(10) Patent No.: US 6,751,104 B2  
(45) Date of Patent: Jun. 15, 2004

(54) SINGLE-STAGE POWER FACTOR CORRECTION METHOD TO REDUCE ENERGY STORAGE CAPACITOR VOLTAGE AND CIRCUIT FOR SAME

(75) Inventors: Chongming Qiao, Irvine, CA (US); Keyue M. Smedley, Irvine, CA (US); Thomas A. Brooks, Carlsbad, CA (US); Tetsuhiko Shimpo, Poway, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/182,858

(22) PCT Filed: Feb. 1, 2001

(86) PCT No.: PCT/US01/03388  
§ 371 (c)(1),  
(2), (4) Date: Nov. 14, 2002

(87) PCT Pub. No.: WO01/57998  
PCT Pub. Date: Aug. 9, 2001

(65) Prior Publication Data  
US 2003/0227784 A1 Dec. 11, 2003

Related U.S. Application Data

(60) Provisional application No. 60/179,719, filed on Feb. 2, 2000.

(51) Int. Cl.[7] ............................................. H02M 3/335
(52) U.S. Cl. ..................................................... 363/21.16
(58) Field of Search ................................ 363/20, 21.12, 363/21.16, 37

(56) References Cited

U.S. PATENT DOCUMENTS

| | | | | |
|---|---|---|---|---|
| 5,946,201 A | * | 8/1999 | Kim ............................. 363/21 |
| 6,038,146 A | * | 3/2000 | Luo et al. ..................... 363/21 |
| 6,108,218 A | * | 8/2000 | Igarashi et al. ............. 3363/21 |
| 6,466,463 B1 | * | 10/2002 | Morita ..................... 363/21.16 |
| 6,473,318 B1 | * | 10/2002 | Qian et al. ............... 363/21.16 |

* cited by examiner

*Primary Examiner*—Jeffrey Sterrett  
(74) *Attorney, Agent, or Firm*—Daniel L. Dawes; Myers Dawes Andras & Sherman LLP

(57) ABSTRACT

A DC-to-DC converter is coupled to an AC source comprising a rectifier bridge. An input inductor is coupled to the output of the rectifier stage. An auxiliary winding is coupled to the input inductor. The auxiliary winding is characterized by a first number of turns. A storage capacitor is coupled to the auxiliary winding. An output transformer is coupled to the auxiliary winding. A first switch is coupled in series with the primary of the output transformer. The first switch and primary are coupled in parallel with the storage capacitor to the auxiliary winding. The number of turns of the auxiliary is less than the number of turns of the primary so that voltage across the storage capacitor is reduced without load carrying capacity of the DC-to-DC converter.

13 Claims, 10 Drawing Sheets

SINGLE-STAGE POWER FACTOR CORRECTION METHOD TO REDUCE ENERGY STORAGE CAPACITOR VOLTAGE AND CIRCUIT FOR SAME

RELATED APPLICATIONS

The present application is related to U.S. Provisional Patent Application, serial No. 60/179,719, filed on Feb. 2, 2000.

BACKGROUND OF THE INVENTION

1. Field of the Invention

2. Description of the Prior Art

Traditional power supplies with a simple diode rectifier draw highly nonlinear current that pollutes the utility or power circuits. In order to reduce the current harmonics and meet the EN61000-3-2 regulation, many approaches have been proposed. Active two-stage Power factor Correction (PFC) and single-stage PFC, active power filters are typical ways to reduce the harmonics and improve the power factor. For small power supplies (typical below 200 watts), single-stage PFC is attractive due to its low cost. The prior art has introduced a single-stage converter that combined a boost converter with a two-switch dc-dc converter as shown in FIG. 1. This topology employs a two-terminal input-current shaping (ICS) cell that is comprised of one auxiliary winding of transformer, an input inductor and a diode. The turns number of the auxiliary winding is exactly equal to the turns number of primary transformer winding. In other words, the turns ratio between auxiliary winding and primary winding is unity.

The equivalent circuit for the input stage of the prior art converter in FIG. 1 during each switching cycle is shown in FIGS. 2a and 2b for the on and off time equivalent circuits respectively. When the switch is on, the auxiliary transformer winding is in series with the inductor and energy storage capacitor $C_B$. The voltage across the inductor is given by $$V_{Lin}=V_g+N_IV_{CB}/N_p-V_{CB}=V_g \qquad (1)$$

The switch current is the sum of input inductor current and load current, which is given by $$i_{sw}=N_Ii_{Lin}/N_p+i_{dc\text{-}dc}=i_{Lin}+i_{dc\text{-}dc}$$

where $i_{sw}$ is the switching current, $i_{Lin}$ is the input inductor current and $i_{dc\text{-}dc}$ is the current of the dc-dc converter to supply the output power. Because the turns number of the auxiliary winding is the same as the primary winding $N_I=N_p$, the voltage across the inductor is equal to the input voltage $V_g$. When the switch is turned off, the equivalent circuit is shown in FIG. 2b. The inductor current is discharged to energy storage capacitor. The operation is similar to a boost converter. If the inductor operates in a discontinuous conduction mode (DCM), the average input current will approximately follow the input voltage and low current distortion will result. The expected the input current is shown in FIG. 3.

In the prior art, the dc-dc converter is operated in DCM mode. However, DCM usually results in large current ripple leading to large conduction losses for both switch and output diode. For low voltage applications (such as 5 v output), the continuous conduction mode (CCM) of operation of the dc-dc converter is preferred. However, if the dc-dc converter operates in the continuous conduction mode, the energy-storage capacitor voltage $V_{CB}$ is strongly dependent on the load and input voltage. For universal applications, at the light load and high voltage, the dc bus voltage $V_{CB}$ can be as high as 1000 volts.

FIG. 4 shows the calculated capacitor voltage vs. load and input voltage for a 100 w universal input power supply for converter in FIG. 1 with a CCM operated dc-dc converter. It will require high voltage capacitor and high voltage switch, which is undesirable for industry applications due to its high cost.

What is needed is a method to realize a single-stage PFC with reduced capacitor voltage $V_{CB}$.

BRIEF SUMMARY OF THE INVENTION

The invention is a DC-to-DC converter coupled to an AC source comprising a rectifier bridge having an input coupled to the AC source and having an output. An input inductor is coupled to the output of the rectifier stage. An auxiliary winding is coupled to the input inductor. The auxiliary winding is characterized by a first number of turns. A storage capacitor is coupled to the auxiliary winding. An output transformer is provided with a primary winding. The primary is characterized by a second number of turns. A first switch is coupled in series with the primary of the output transformer. The first switch and primary are coupled in parallel with the storage capacitor to the auxiliary winding. The first number of turns is not equal to the second number of turns so that voltage across the storage capacitor is reduced without load carrying capacity of the DC-to-DC converter. In particular, the first number of turns is less than the second number of turns.

Alternatively, DC-to-DC converter may be characterized by a winding ratio, m, between the auxiliary winding and the primary of less than 1.0 and greater than zero. In one illustrated embodiment the winding ratio. m. is approximately 0.73.

The windings ratio has been chosen so that the storage capacitor can be rated at or less than 450 V.

The topology of the DC-to-DC converter in one embodiment may further comprise an inductor in parallel with the storage capacitor.

In another embodiment the DC-to-DC converter may further comprise a second switch coupled in series with the primary and the first switch.

The invention also includes operating a circuit of the foregoing topology and providing a circuit with the foregoing topology.

While the method has been described for the sake of grammatical fluidity as steps, it is to be expressly understood that the claims are not to be construed as limited in any way by the construction of "means" or "steps" limitations under 35 USC 112, but to be accorded the full scope of the meaning and equivalents of the definition provided by the claims. The invention can be better visualized by turning now to the following drawings wherein like elements are referenced by like numerals.

BRIEF DESCRIPTION OF THE DRAWINGS

FIG. 2a is the equivalent circuit for the input stage in FIG. 1 when switch is turned on.

FIG. 7a shows the equivalent circuit of FIG. 5 when the input stage is on.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

This method of the invention uses a non-unity turns ratio between the auxiliary transformer winding and primary winding. In this case, the circuit operation mode is totally changed. By selecting a proper turns ratio, the capacitor voltage is controlled below 450V so that the low cost electrolytic capacitor (typical below 450V) can be used. In the mean time, the output dc-dc converter can still operate in CCM mode at a heavy load so that the output inductor current ripple is smaller and the efficiency is higher. These features are very desirable for low output applications. The sacrifice is that the input current waveform has slightly larger distortion comparing with the converter in FIG. 1. However, with proper design, the input current harmonics can still meet the standards. Overall, the performance is improved and cost is reduced.

Figure 1:
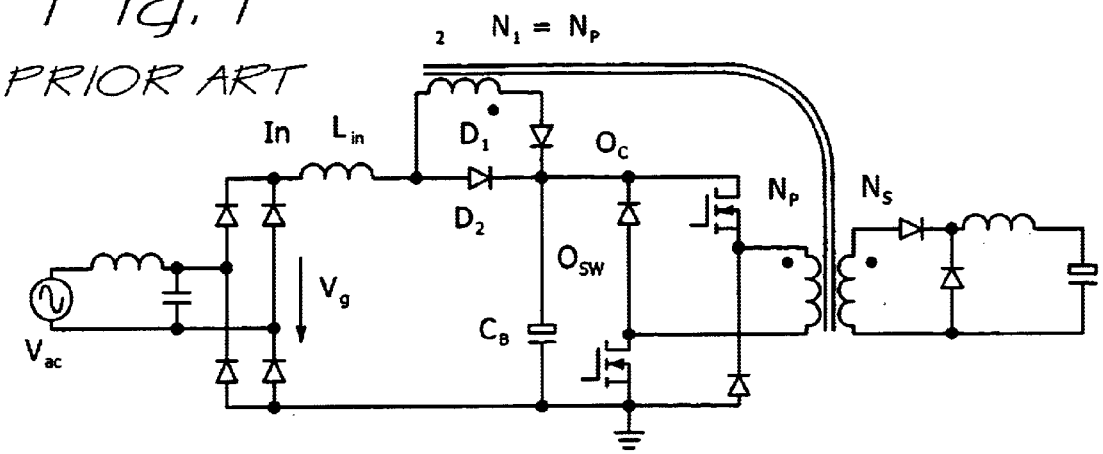
FIG. 1 is a circuit diagram of a prior art single stage power factor correction circuit.
Figure 2A:
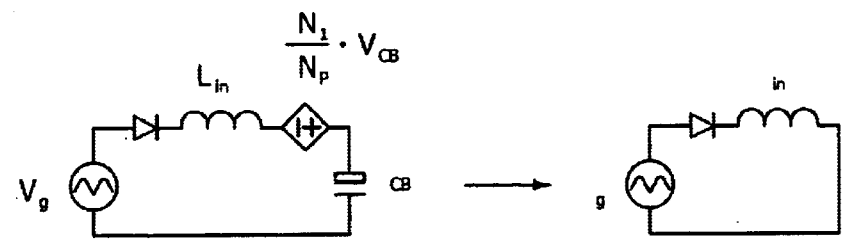
Figure 2B:
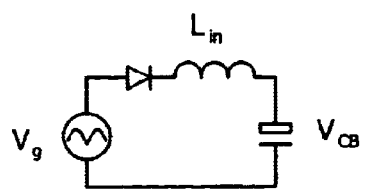
FIG. 2b is the equivalent circuit for the input stage in FIG. 1 when switch is turned off.
Figure 3:
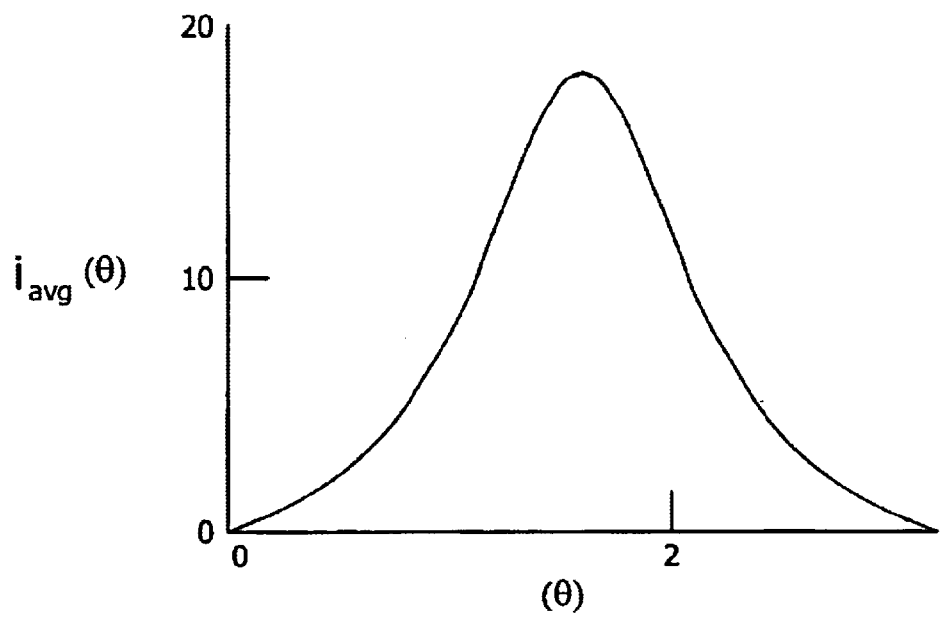
FIG. 3 is a graph of the expected input inductor current for single-stage power factor correction circuit in FIG. 1.
Figure 4:
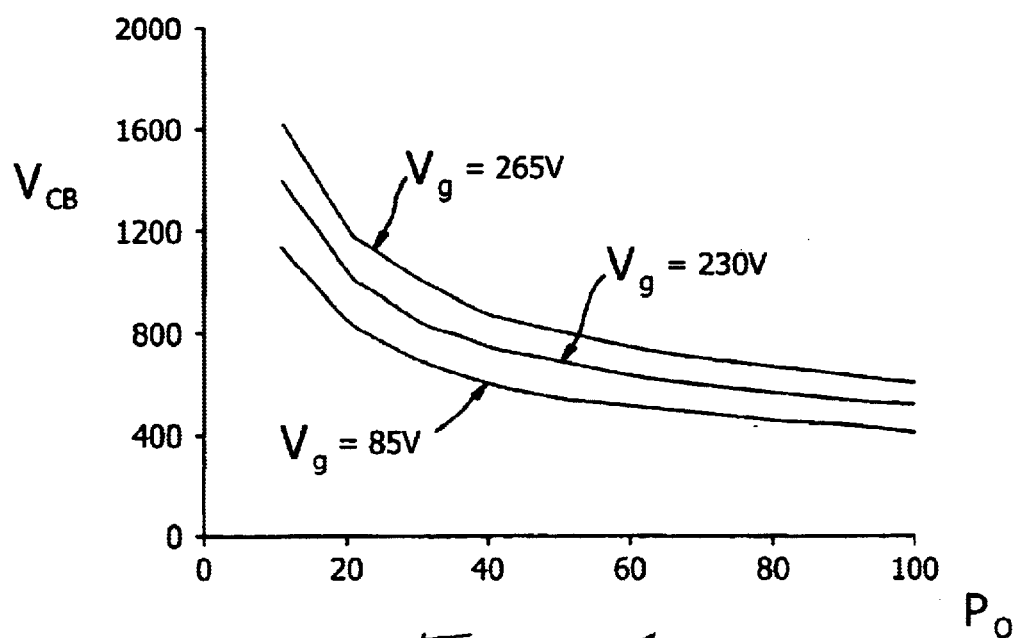
FIG. 4 is a graph of the DC bus capacitor voltage $V_{CB}$ verses the load and input voltage when the dc-dc converter operates in continuous conduction mode.
Figure 5:
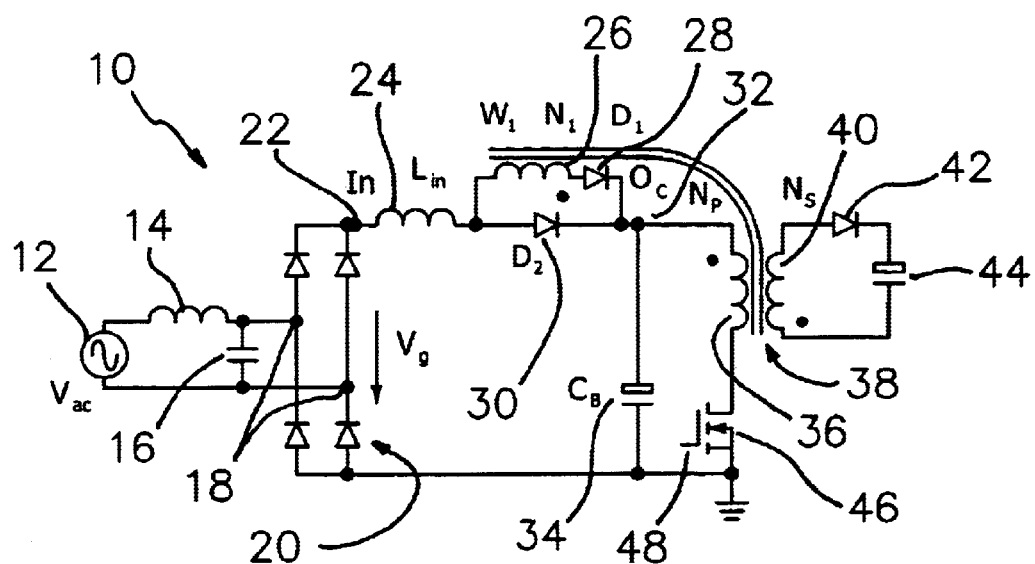
FIG. 5 is a circuit diagram of a single-stage flyback converter with the power-factor-correction method of the invention.
Figure 6:
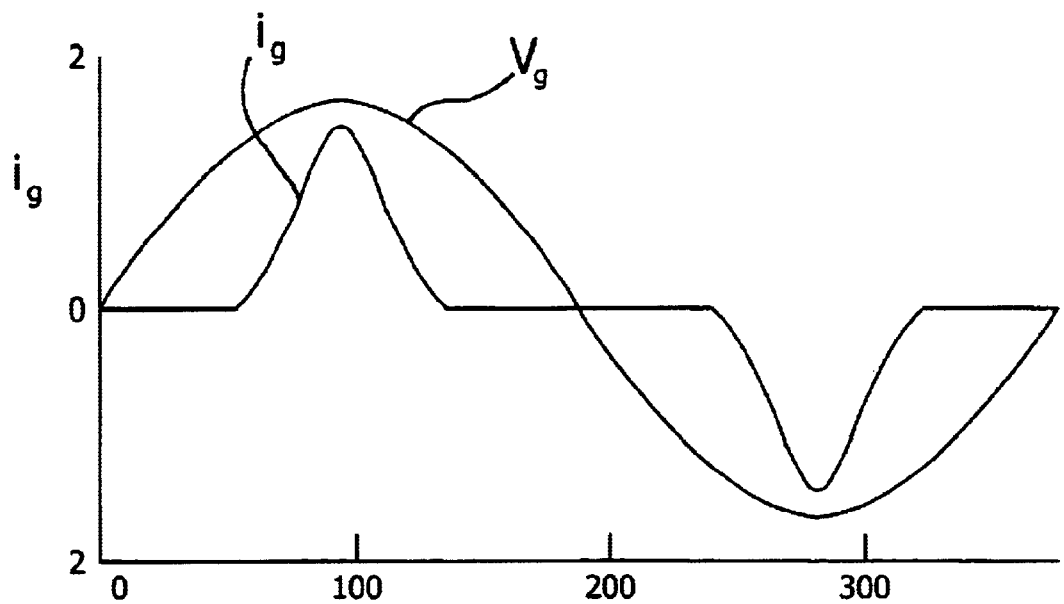
FIG. 6 is a graph of a calculated input current waveform according to the invention.

An example of a single-stage flyback converter with the design of the invention is shown in FIG. 5. An illustration of the input current waveform is shown in FIG. 6. The major change in comparison to the converter of FIG. 1 is that the turns number of auxiliary winding is smaller. Circuit 10 is comprised of a source of single phase AC power 12 coupled through discrete or lumped line inductance 14 and line capacitance 16 to the inputs 18 of a full wave rectifier 20. Output 22 of full wave rectifier 20 is coupled at its high side to inductance 24 and then to inductor 26 and diode 28 bridged by diode 30. The output 32 is coupled across capacitor 34 and primary 36 of transformer 38. The secondary 40 of transformer 38 is coupled to a series load of diode 42 and capacitor 44. Primary 36 is switched by transistor 46 having a gate 48.

Figure 7A:
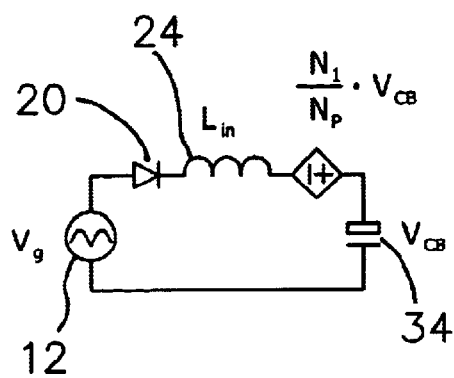
Figure 7B:
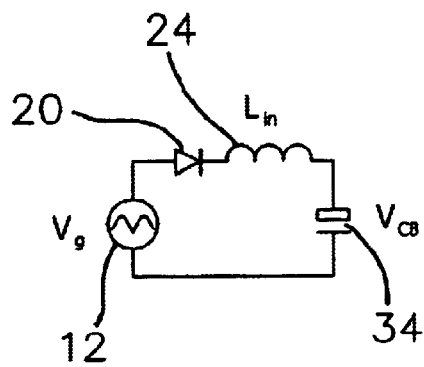
FIG. 7b shows the equivalent circuit of FIG. 5 when the input stage is off.
Figure 8:
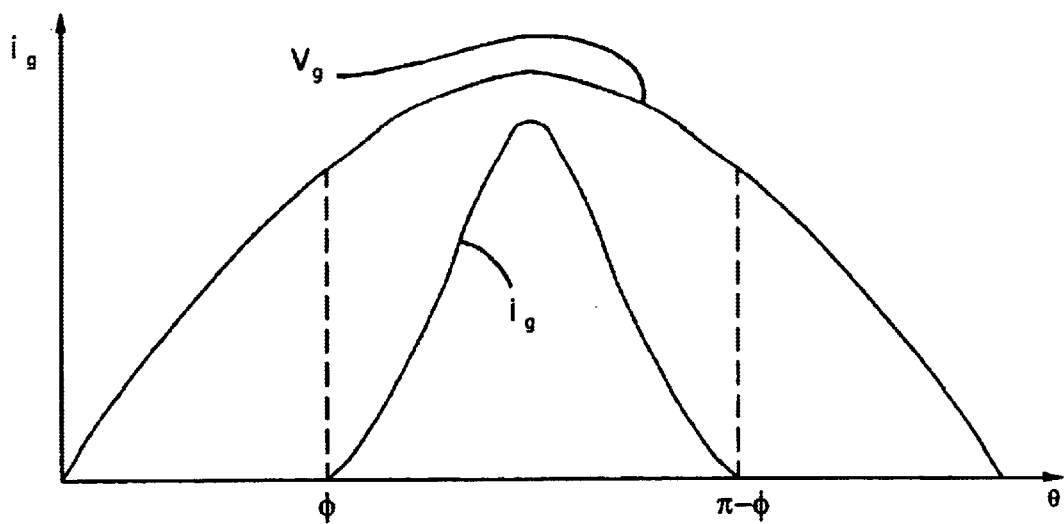
FIG. 8 is a graph of the input inductor current during a half line cycle.

Consider now an illustrated embodiment of the proposed single-stage PFC and its method of operation. The equivalent circuits for the proposed converter in FIG. 5 is shown in FIGS. 7a and 7b. FIG. 7a shows the equivalent circuit when the input stage is on, and FIG. 7b shows the equivalent circuit when the input stage is off. If the voltage $V_g+N_IV_{CB}/N_p \leq V_{CB}$, the input inductor current is zero. The expected input current waveform during a half line cycle is shown in FIG. 8. The dead angle, $\phi$, is calculated by setting $$\sqrt{2}\,V_{grms}\sin(\varphi) + \frac{N_I}{N_p}V_{CB} = V_{CB}$$

where $V_g = \sqrt{2}V_{grms}|\sin(\theta)|$ where $\theta$ is the phase angle, so that the dead angle, $\phi$, is given by $$\varphi = a\sin\left(\frac{mV_{CB}}{\sqrt{2}\,V_{grms}}\right)$$

where $m=1-N_I/N_p$ shows the relationship between the auxiliary winding $N_I$ of inductor 26 and the primary transformer winding 36, $N_p$, and $V_{CB}$ is the dc bulk capacitor voltage across capacitor 34. Suppose the condition $\phi \leq \theta \leq \pi-\phi$ is satisfied. The PFC inductor current during one switching period is shown in the graph of FIG. 9.

Figure 9:
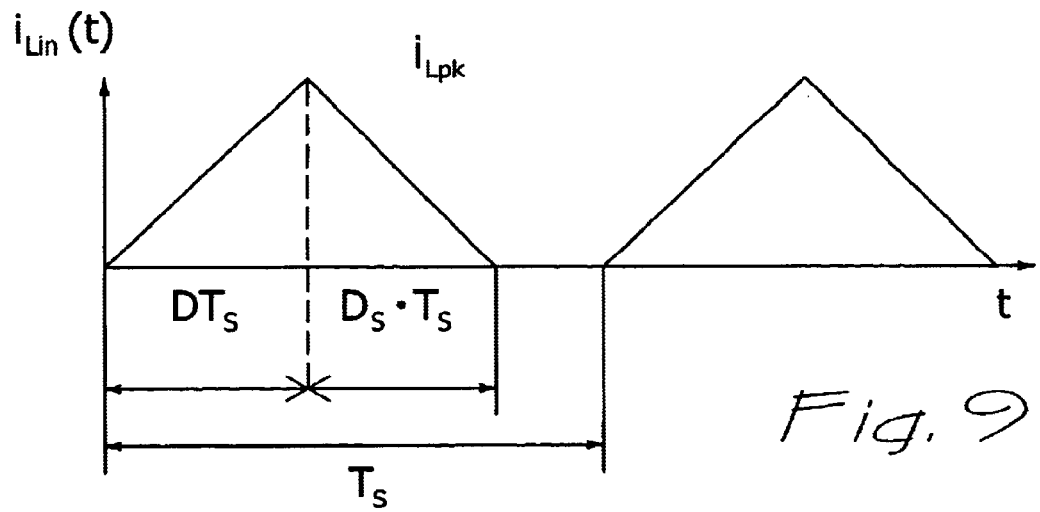
FIG. 9 is a graph of the PFC inductor current waveform in one switching cycle.

When the switch 46 is on, there is a positive voltage across the auxiliary winding 26 and the diode 30 is blocked. The peak inductor current is given by $$i_{Lin\,pk} = \frac{V_g - \left(1 - \frac{N_I}{N_p}\right)V_{CB}}{L_{in}}DT_s = \frac{V_g - mV_{CB}}{L_{in}}DT_s \tag{5}$$

where D is duty ratio, $T_s$ the time between cycles as depicted in FIG. 9. During a line cycle, the duty ratio is approximately constant.

When switch 46 is off, the inductor current is discharged and the energy stored in the inductor 26 will be transferred into the dc bulk capacitor 34. From the volt-second balance of the input inductor 24, we have $$D(V_g-mV_{CB})=D_I(V_{CB}-V_g) \tag{6}$$

$D_I$ is solved as $$D_I=[(V_g-mV_{CB})/(V_{CB}-V_g)]D \tag{7}$$

The average input current during each switching cycle is given by $$\langle i_{Lin} \rangle = \frac{1}{2}(D + D_l)i_{Lin\,pk} \quad (8)$$

The combination equation (7), (8) and (5) yields:

$$\langle i_{Lin} \rangle = \frac{D^2 T_s}{2L_{in}}(V_g - mV_{CB})\frac{(1-m)V_{CB}}{V_{CB} - V_g} \quad (9)$$

The average input power during half line cycle is given by $$P_{in} = \frac{1}{T_i/2}\int_0^{T/2} V_g \langle i_{Lin} \rangle\, dt \quad (10)$$

where $T_i$ is line period. Assuming input voltage can be expressed as follows:

$$V_g = \sqrt{2}V_{grms}\sin(\omega t) = V_{gpk}\sin(\theta) \quad (11)$$

where $V_{gpk}$ is the peak voltage, and $\omega$ is the line frequency and t is the time. Equation (10) can be rewritten as:

$$P_{in} = \frac{D^2 T_s}{2L_{in}}\frac{1}{\pi}\int_\varphi^{\pi-\varphi} V_{gpk}\sin(\theta)(V_{gpk}\sin(\theta) - mV_{CB})\frac{(1-m)V_{CB}}{V_{CB} - V_{gpk}\sin(\theta)}d\theta \quad (12)$$

Under the consumption that the efficiency is 100%, the average input power equals the output power during half line cycle, which yields $$P_O = P_{in} = \quad (13)$$

$$\frac{D^2 T_s}{2L_{in}}\frac{1}{\pi}\int_\varphi^{\pi-\varphi} V_{gpk}\sin(\theta)(V_{gpk}\sin(\theta) - mV_{CB})\frac{(1-m)V_{CB}}{V_{CB} - V_{gpk}\sin(\theta)}d\theta$$

The duty ratio is given by $$D = \frac{nV_0}{nV_0 + V_{CB}} \text{ in the } CCM \text{ condition} \quad (14)$$

$$D = \sqrt{\frac{2L_p P_o}{V_{CB}^2 T_s}} \text{ in the } DCM \text{ condition}$$

Substitution of the above equation into equation (13) yields the relationship between the capacitor voltage $V_{CB}$ and other parameters such as output power $P_o$, input voltage peak $V_{gpk}$ and the inductor ratio $L_p/L_{in}$ as well as the winding ratio $m=(N_p-N_l)/N_p$. This relationship is shown in equation (15) below.

$$P_O = \left(\frac{nV_0}{nV_0 + V_{CB}}\right)^2 \frac{T_s}{2L_{in}}\frac{1}{\pi}\int_\varphi^{\pi-\varphi} V_{gpk}\sin(\theta)(V_{gpk}\sin(\theta) - mV_{CB})\frac{(1-m)V_{CB}}{V_{CB} - V_{gpk}\sin(\theta)}d\theta \quad (15)$$

in the CCM mode $$M_L = \frac{L_{in}}{L_p} = \frac{1}{V_{CB}^2}\frac{1}{\pi}\int_\varphi^{\pi-\varphi} V_{gpk}\sin(\theta)(V_{gpk}\sin(\theta) - mV_{CB})\frac{(1-m)V_{CB}}{V_{CB} - V_{gpk}\sin(\theta)}d\theta$$

in the DCM mode.

Where $M_L$ is the inverse of the inductor ratio. The CCM and DCM condition is given by $$\frac{2L_p P_o}{T_s} \leq \left(\frac{nV_o V_{CB}}{nV_o + V_{CB}}\right) \quad (16)$$

Figure 11:
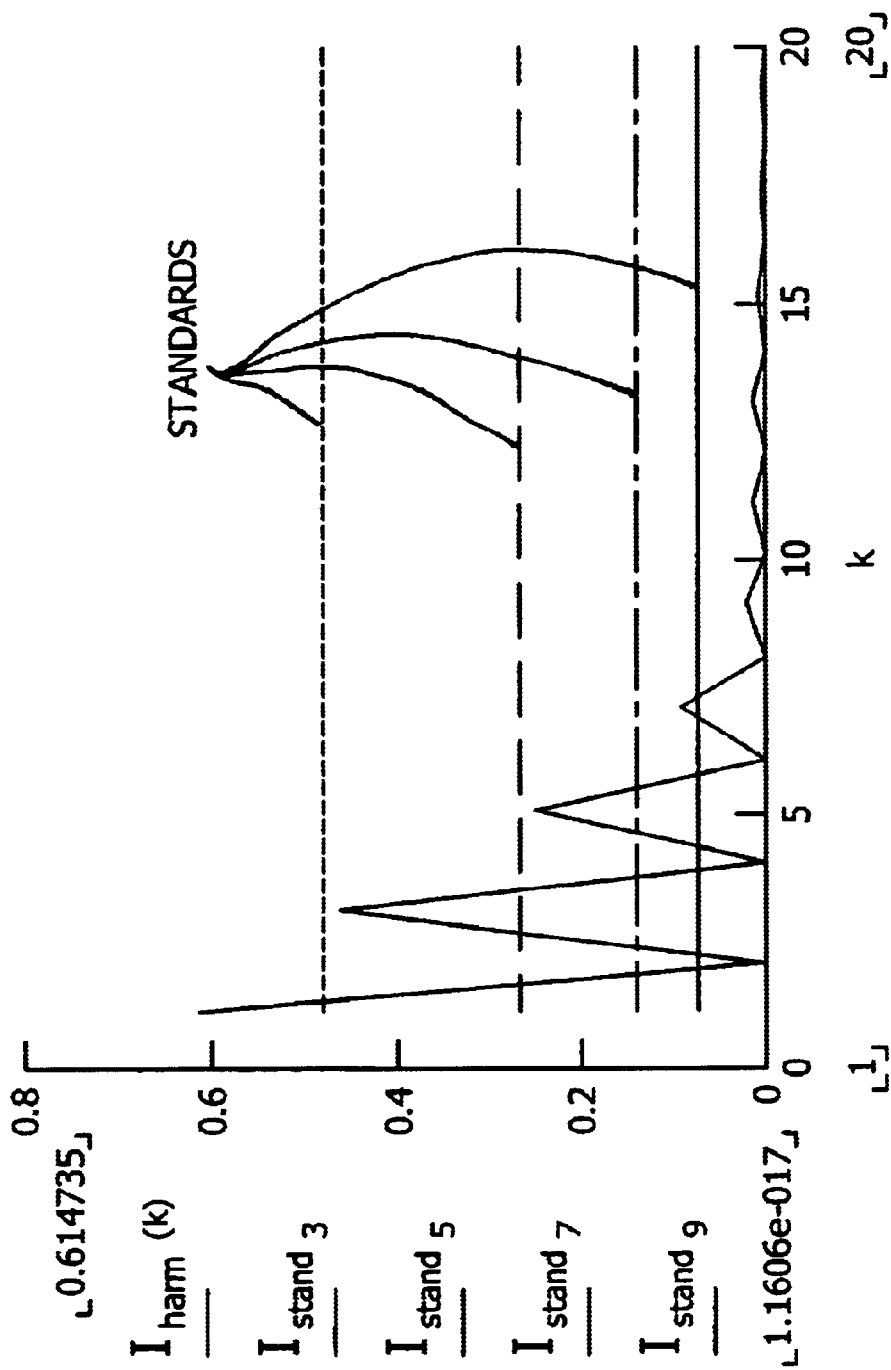
FIG. 11 is a graph of the calculated input current spectrum and the EN61000-3-2 harmonic limitation.

The resulting capacitor voltage $V_{CB}$ doesn't have a closed form, but it can be solved numerically. Analysis shows that a large winding ratio m will result in lower capacitor voltage; however, the total harmonic distortion, THD, of input current waveform will become higher. There is a trade off in the design. An example of calculated $V_{CB}$ for a 100 W 5V 20A output power supply is shown in FIG. 6. The parameters of power supply are as follows: $P_o$=100W, $V_o$=5V; input inductance $L_{in}$=25 µH; primary inductance of the flyback transformer is $L_p$=236 µH; switching frequency is $f_s$=50 kHz. The winding ratio is m=0.73. The calculated input harmonic depicted in FIG. 11 shows that the proposed converter can meet the EN61000-3-2 standard. Because the allowed output inductance is much higher as compared with the prior art converter shown in FIG. 1, the output will have lower output current ripple and a higher efficiency. In the mean time, the capacitor voltage is limited to be below 450V so that low cost is guaranteed.

Furthermore, by reducing the turns ratio between the auxiliary winding and primary winding, the switching current stress is also reduced. The switching current is given by $$i_{sw} = \frac{N_l}{N_p}i_{Lin} + i_{dc-dc} < i_{Lin} + i_{dec-dc}(N_l < N_p) \quad (17)$$

Comparing with the current of converter in FIG. 1 (expressed in Equation 2), switching current is smaller. This is another advantage of the invention.

Figure 12:
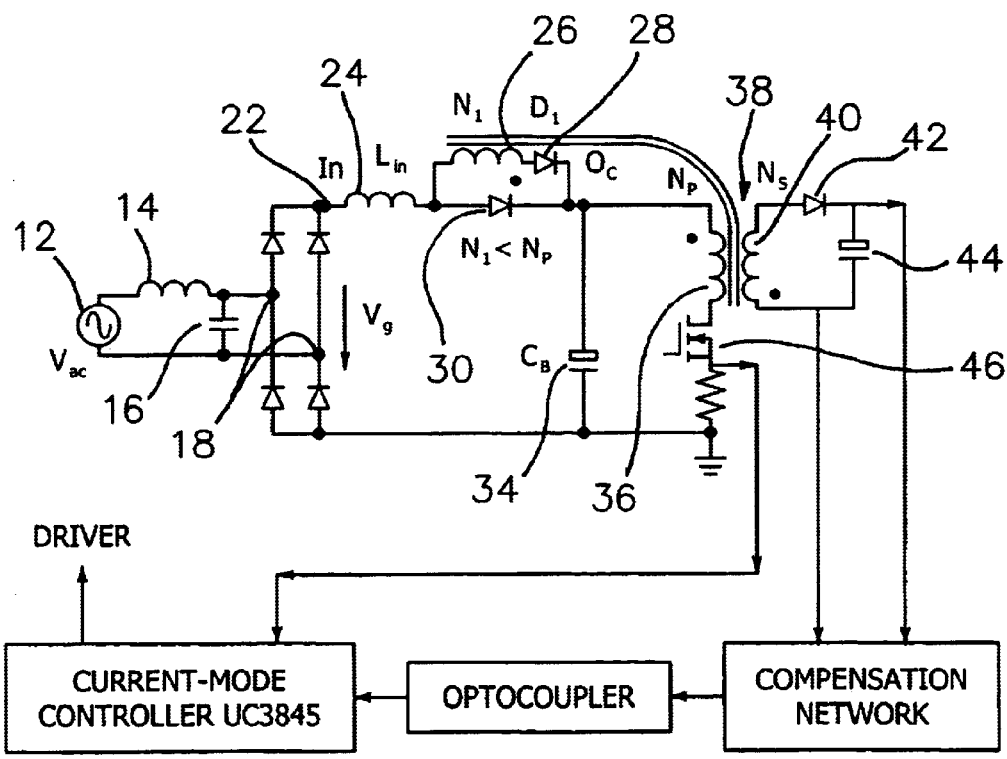
FIG. 12 is a schematic of a single-stage PFC with flyback converter prototype built according to the invention.
Figure 10:
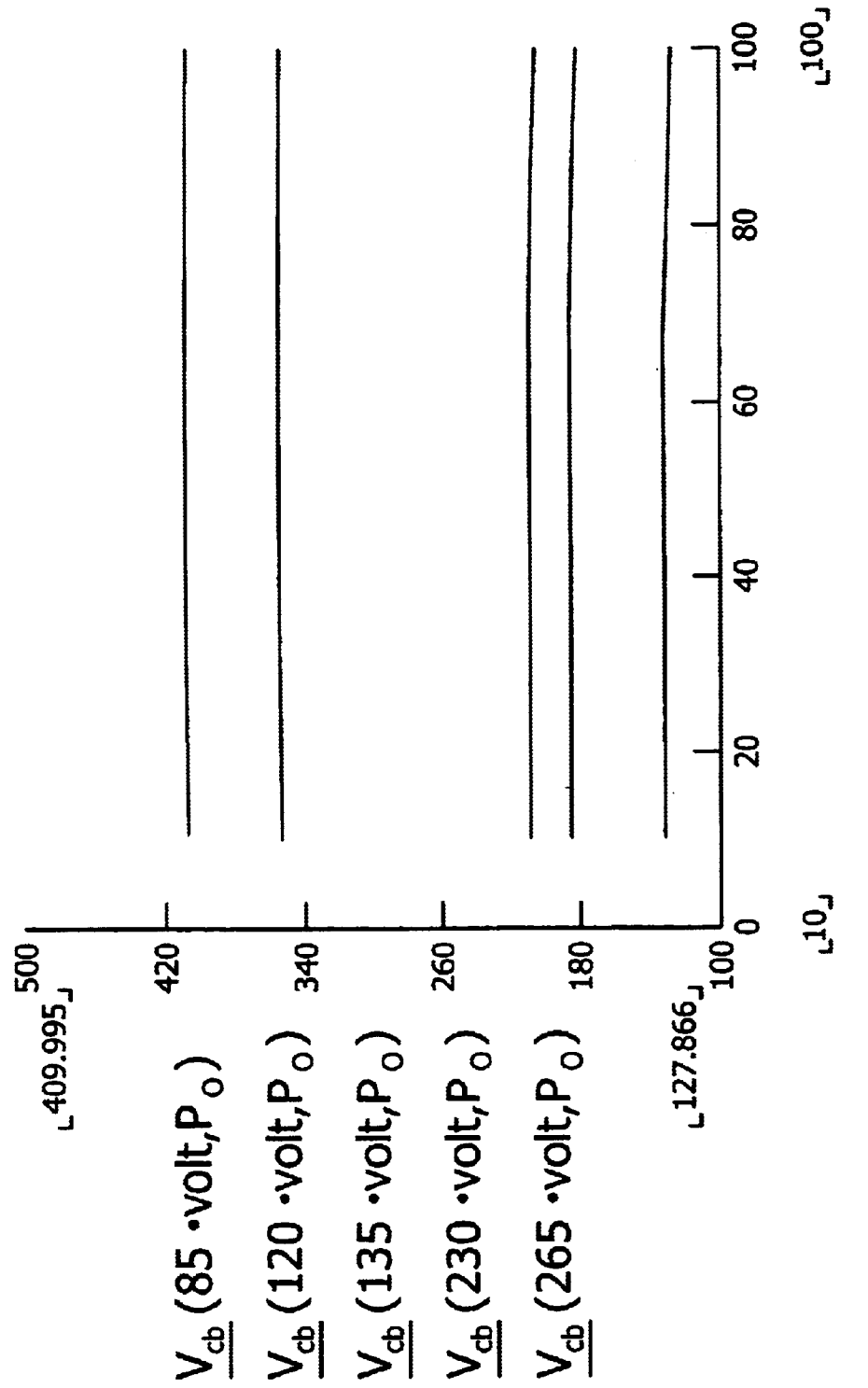
FIG. 10 is a graph of a calculated capacitor voltage $V_{CB}$ verses output power $P_o$ and input voltage $V_g$.

Consider now an experimental verification of the above theoretical predictions. In the illustrated embodiment a prototype single-stage PFC 10 with flyback converter was built to verify the concept. A schematic of the single-stage PFC 10 is shown in FIG. 12. The experimental condition is as follows: output power 100 watts (5V at 20A); input voltage: 90~265 Vrms. The parameters of this converter are: input inductor 30 µH; flyback primary inductance is 200 µH. Transformer turns: primary winding 47 turns; auxiliary winding or feedback winding: 16 turns, output winding 5 turns.

Figure 13:
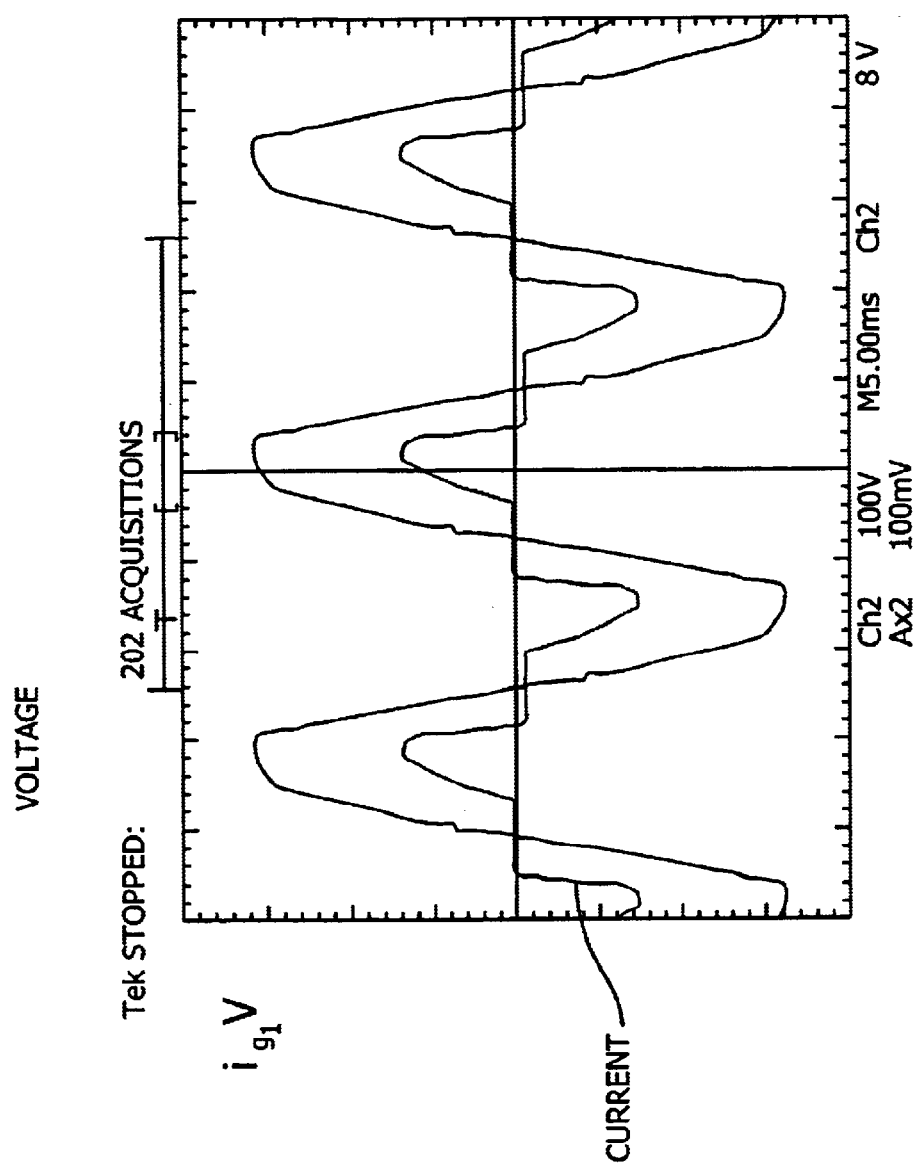
FIG. 13 is an graph of experimentally measured voltage and current waveforms.
Figure 14:
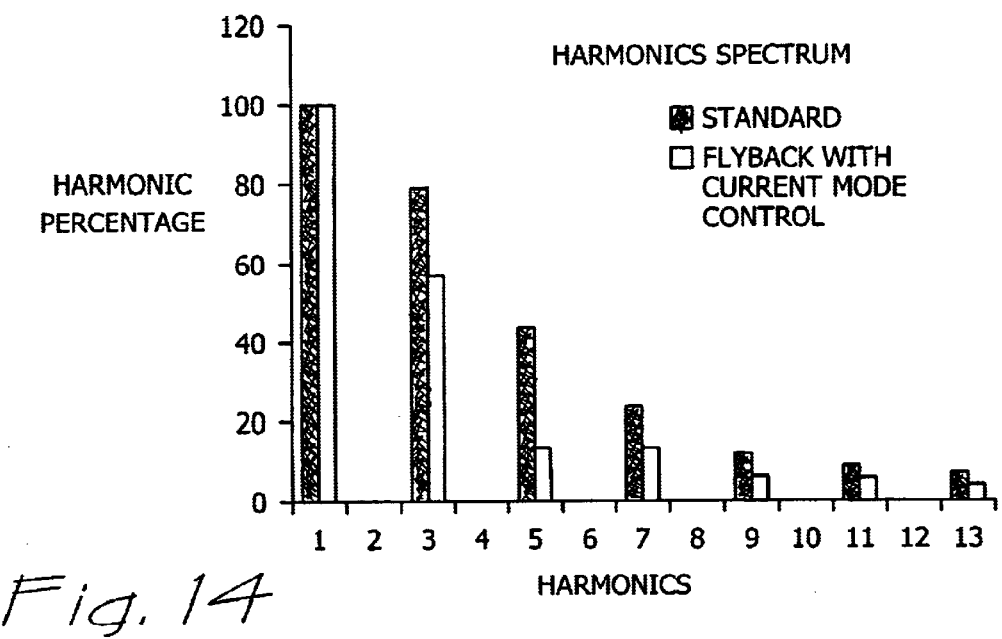
FIG. 14 is a bar chart comparing the experimentally measured harmonics of a single stage power factor corrected converter of the invention to an industry standard.
Figure 15:
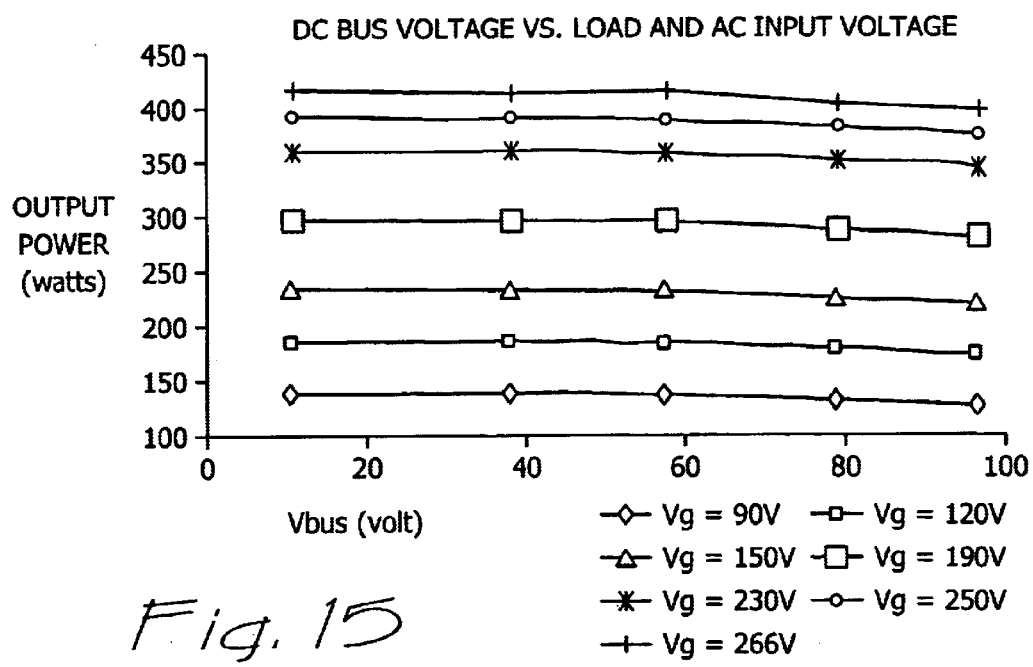
FIG. 15 is a graph of the experimentally measured DC bus or output voltage verses the power load and input AC voltage, $V_g$.

The experimental input voltage and current waveforms are shown in FIG. 13. The harmonics comparison with the EN61000-3-2 standard is shown in FIG. 14. The dc bus voltage versus load and input voltage is shown in FIG. 15. The experimental prototype demonstrates that the harmonic of a single-stage PFC 10 can meet the EN61000-32 standard. In the meantime, the dc-bus voltage is below 450V so that a low cost electrolytic capacitor can be used as analyzed above.

The invention can thus be appreciated as a method of achieving a single-stage PFC 10 with reduced energy storage capacitor voltage. With this approach, the energy storage capacitor voltage $V_{CB}$ is controlled to below 450V for universal input conditions by reducing the turns ratio between auxiliary winding and primary winding.

Therefore, a low cost electrolytic capacitor can be used. The CCM operated dc-dc converter results in high efficiency, low output current ripple which are very desirable for low voltage applications. By reducing the turns ratio, the current flows into the switch 46 is also reduced, which results in smaller current rating of switch 46. Overall, the cost is reduced and the harmonics can still meet the harmonics standard EN61000-3-2. This method provides a cost-effective solution. The method of the invention has been experimentally verified in a flyback converter and it is applicable to forward converters as well.

Figure 16A:
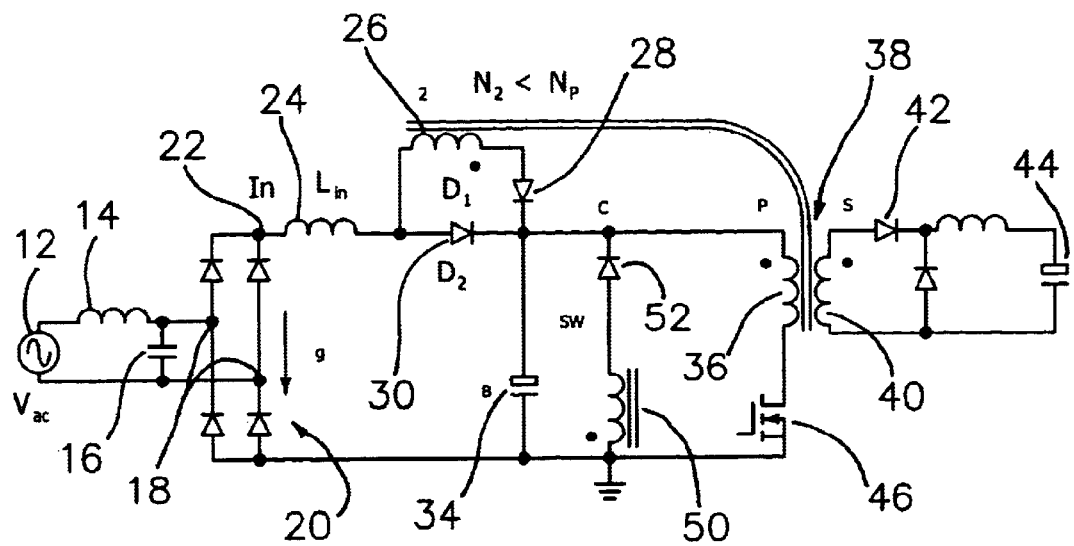
FIG. 16a is a schematic of a single-stage power factor corrected converter modified according to the method of the invention to reduce energy storage capacitor voltage in which the topology of the circuit is a single-stage single-switch forward converter.

FIG. 16a is a schematic of a single switch forward converter which is identical to the circuit of FIG. 5 but with the addition of an inductor 50 and diode 52 in series with each other and in parallel to capacitor 34.

Figure 16B:
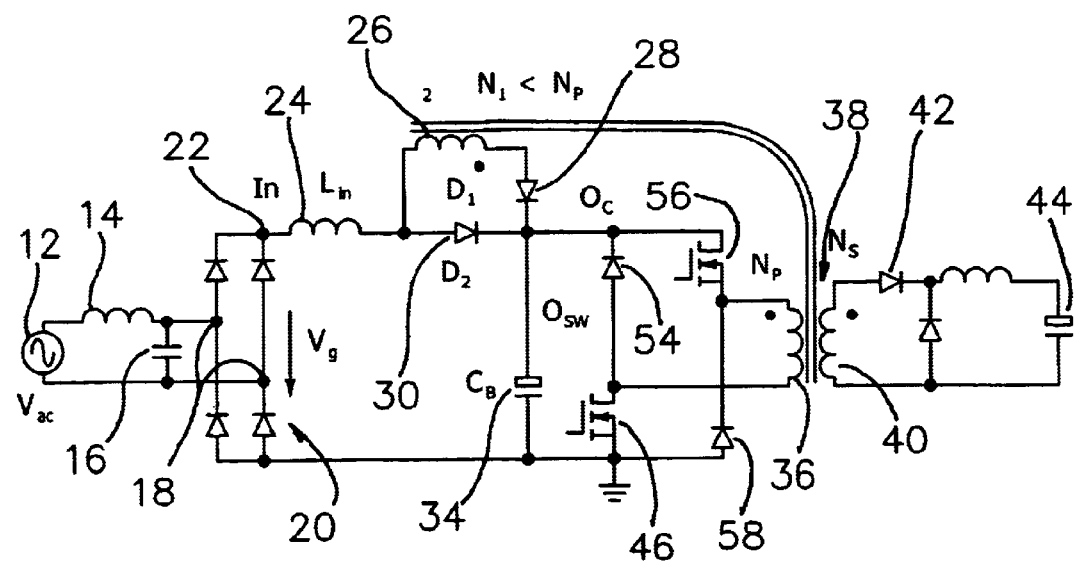
FIG. 16b is a schematic of a single-stage power factor corrected converter modified according to the method of the invention to reduce energy storage capacitor voltage in which the topology of the circuit is a single-stage two-switch forward converter.

FIG. 16b is a schematic of a two switch forward converter which is identical to the circuit of FIG. 5 but in which switch 46 is coupled in series to a diode 54 and where switch 46 and diode 54 are in parallel with capacitor 34. A second switch 56 in series with a diode 58 has been added also in parallel with capacitor 34. Switches 46 and 56 are coupled in series with each other and with primary winding 36.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An AC-to-DC converter coupled to an AC source comprising:

a rectifier bridge having an input coupled to said AC source and having an output;

an input inductor coupled to said output of said rectifier stage;

an auxiliary branch comprised of an auxiliary transformer winding of the output transformer coupled to said input inductor, said auxiliary transformer winding being characterized by a first number of turns and a auxiliary diode in series with the auxiliary transformer winding;

a primary branch in parallel with the auxiliary branch and comprised of a primary diode coupled to said input inductor;

a storage capacitor coupled to said auxiliary winding through the auxiliary diode;

a primary of an output transformer, said primary being characterized by a second number of turns; and a first switch coupled in series with said primary of said output transformer; said first switch and primary being coupled in parallel with said storage capacitor to said auxiliary winding through the auxiliary diode, wherein said first number of turns is not equal to said second number of turns so that voltage across said storage capacitor is reduced without sacrificing load carrying capacity of said AC-to-DC converter.

2. The AC-to-DC converter of claim 1 where said first number of turns is less than said second number of turns.

3. The AC-to-DC converter of claim 1 characterized by a winding ratio, m, between said auxiliary transformer winding and said primary of less than 1.0 and greater than zero.

4. The AC-to-DC converter of claim 3 where said winding ratio, m, is approximately 0.73.

5. The AC-to-DC converter of claim 1 where said storage capacitor is rated at or less than 450 V.

6. An AC-to-DC converter coupled to an AC source comprising:

a rectifier bridge having an input coupled to said AC source and having an output;

an input inductor coupled to said output of said rectifier stage;

an auxiliary winding coupled to said input inductor, said auxiliary winding being characterized by a first number of turns;

a storage capacitor coupled to said auxiliary winding;

a primary of an output transformer, said primary being characterized by a second number of turns;

a first switch coupled in series with said primary of said output transformer; said first switch and primary being coupled in parallel with said storage capacitor to said auxiliary winding, wherein said first number of turns is not equal to said second number of turns so that voltage across said storage capacitor is reduced without sacrificing load carrying capacity of said AC-to-DC converter; and an inductor in parallel with said storage capacitor.

7. The AC-to-DC converter of claim 6 where said first number of turns is less than said second number of turns.

8. An AC-to-DC converter coupled to an AC source comprising:

a rectifier bridge having an input coupled to said AC source and having an output;

an input inductor coupled to said output of said rectifier stage;

an auxiliary winding coupled to said input inductor, said auxiliary winding being characterized by a first number of turns;

a storage capacitor coupled to said auxiliary winding;

a primary of an output transformer, said primary being characterized by a second number of turns;

a first switch coupled in series with said primary of said output transformer; said first switch and primary being coupled in parallel with said storage capacitor to said auxiliary winding, wherein said first number of turns is not equal to said second number of turns so that voltage across said storage capacitor is reduced without sacrificing load carrying capacity of said AC-to-DC converter; and a second switch coupled in series with said primary and said first switch.

9. The AC-to-DC converter of claim 8 where said first number of turns is less than said second number of turns.

10. A method of operating an AC-to-DC converter coupled to an AC source comprising:

providing an AC signal to a rectifier bridge having an input coupled to said AC source and having an output, an input inductor coupled to said output of said rectifier bridge, an auxiliary branch comprised of an auxiliary transformer winding and auxiliary diode coupled to said input inductor, said auxiliary transformer winding being characterized by a first number of turns, a storage capacitor coupled to said auxiliary winding through the auxiliary diode, a primary branch comprised of a primary diode coupled between the input inductor and the storage capacitor, a primary of an output transformer, said primary being characterized by a second number of turns, and a first switch coupled in series with said primary of said output transformer; said switch and primary being coupled in parallel with said storage capacitor to said auxiliary transformer winding through the auxiliary diode; and reducing current flow into said switch and reducing the voltage across the storage capacitor by fixing said first number of turns to be less than said second number of turns.

11. The method of claim 10 where said AC-to-DC converter is characterized by a winding ratio, m, between said auxiliary transformer winding and said primary and where reducing current flow reduces said of winding ratio to a range where $0<m<1$.

12. The method of claim 11 where reducing said winding ratio, m, reduces m to approximately 0.73.

13. The method of claim 10 where reducing current flow reduces voltage applied across said storage capacitor to less than 450 V.

* * * * *